(12) United States Patent
Iwasaki et al.

(10) Patent No.: US 8,197,374 B2
(45) Date of Patent: Jun. 12, 2012

(54) AUTOMATIC TRANSMISSION

(75) Inventors: Tatsuhiko Iwasaki, Hiroshima (JP);
Masako Shinohara, Hiroshima (JP)

(73) Assignee: Mazda Motor Corporation (JP)

( * ) Notice: Subject to any disclaimer, the term of this patent is extended or adjusted under 35 U.S.C. 154(b) by 626 days.

(21) Appl. No.: 12/367,863

(22) Filed: Feb. 9, 2009

(65) Prior Publication Data
US 2009/0215567 A1  Aug. 27, 2009

(30) Foreign Application Priority Data

Feb. 27, 2008  (JP) ................. 2008-045547

(51) Int. Cl.
F16H 57/10  (2006.01)
F16H 31/00  (2006.01)
F16H 57/02  (2006.01)

(52) U.S. Cl. ............... 475/271; 475/116; 74/606 R
(58) Field of Classification Search ............... 475/169, 475/271, 296, 116; 74/606 R; 192/85.2, 192/85.24, 85.56
See application file for complete search history.

(56) References Cited

U.S. PATENT DOCUMENTS

| | | | | |
|---|---|---|---|---|
| 5,160,008 A * | 11/1992 | Peier | ............ | 192/85.24 |
| 5,224,906 A | 7/1993 | Sturm | | |
| 5,525,115 A * | 6/1996 | Vanzini | ............ | 475/146 |
| 7,353,928 B2 * | 4/2008 | Yoshioka | ............ | 192/85.02 |
| 7,370,744 B2 * | 5/2008 | Fujita et al. | ............ | 192/85.01 |
| 2002/0020601 A1 * | 2/2002 | Martin et al. | ............ | 192/85 AA |
| 2002/0115523 A1 * | 8/2002 | Ohkubo et al. | ............ | 475/286 |
| 2003/0104895 A1 * | 6/2003 | Yasuda et al. | ............ | 475/269 |
| 2005/0090360 A1 * | 4/2005 | Armstrong et al. | ............ | 475/269 |
| 2005/0279602 A1 * | 12/2005 | Ruth | ............ | 192/48.3 |

FOREIGN PATENT DOCUMENTS

| | | |
|---|---|---|
| EP | 1298355 A | 4/2003 |
| EP | 1382884 A | 1/2004 |
| JP | 2007225020 A | 9/2007 |

OTHER PUBLICATIONS

European Search Report issued on Apr. 7, 2009; Application No./Patent No. 09002153.6-2421.

* cited by examiner

*Primary Examiner* — Roger Pang
(74) *Attorney, Agent, or Firm* — Studebaker & Brackett PC; Donald R. Studebaker

(57) ABSTRACT

An automatic transmission comprises a multi-plate brake to brake a specified rotational element of a transmission mechanism, which includes a plurality of frictional plates, a piston, a piston cylinder member comprising cylinder in which the piston slides, and oil-pressure chambers which are formed between the piston and the cylinder and bias the piston toward the frictional plates with an oil pressure supplied thereto, and a valve body to supply the oil pressure to the oil-pressure chambers. Herein, the valve body is provided in the vicinity of an outer periphery of the piston cylinder member so as to be connected to the piston cylinder member via a connection portion, and there is provided an oil passage to supply the oil pressure from the valve body to the oil-pressure chambers via the connection portion.

6 Claims, 5 Drawing Sheets

|  | 1st clutch (40) | 2nd clutch (50) | 1st brake (60) | 2nd brake (70) | 3rd brake (80) |
|---|---|---|---|---|---|
| 1st gear | O |  | (O) |  |  |
| 2nd gear | O |  |  | O |  |
| 3rd gear | O |  |  |  | O |
| 4th gear | O | O |  |  |  |
| 5th gear |  | O |  |  | O |
| 6th gear |  | O |  | O |  |
| R. gear |  |  | O |  | O |

FIG. 2

AUTOMATIC TRANSMISSION

BACKGROUND OF THE INVENTION

The present invention relates to an automatic transmission which may be installed to automotive vehicles.

In general, an oil pressure to connect a multi-plate brake of the automatic transmission installed to automotive vehicles is supplied to an oil-pressure chamber provided behind a piston and controlled by a valve body which is provided at a transmission case. Specifically, the oil pressure is supplied not directly to the oil-pressure chamber from the valve body, but via an oil passage which is formed in a wall portion of the transmission case.

Further, as disclosed in Japanese Patent Laid-Open Publication No. 2007-225020, the transmission case is comprised of a cylindrical body case and an end cover which closes an opening of an end portion of the body case, and in case the multi-plate brake is provided at the end cover, the oil pressure is supplied to the oil-pressure chamber from the valve body via the oil passage formed in the wall portion of the body case and an oil passage which is formed in a wall portion of the end cover.

Meanwhile, in case the multi-plate brake is provided at the above-described end cover and the piston and the oil-pressure chamber are provided at a piston cylinder member (including a cylinder in which the piston slides) which is provided at the end cover, the oil pressure is supplied to the oil-pressure chamber from the valve body via the oil passage formed in the wall portion of the body case, the oil passage formed in the wall portion of the end cover, and an oil passage which is formed in the piston cylinder member.

Herein, in case the oil pressure is supplied to the oil-pressure chamber via the respective oil passages formed in the wall portions of the body case and the end cover, the oil passages may become long and have many bending portions. In case the oil pressure is supplied to the oil passage formed in the piston cylinder member, the oil passages may become longer and have more bending portions. Accordingly, the flow resistance of the oil passages increases and the responsibility of the oil supply decreases, so that the controllability of the multi-plate brake would deteriorate. Further, manufacturing costs for forming the oil passages at the transmission case and the like would increase, and a risk of leakage of the oil pressure would improperly increase due to many connection portions and sealing portions which are formed at the oil passages.

SUMMARY OF THE INVENTION

Accordingly, an object of the present invention is to provide an automatic transmission which can improve the controllability of the multi-plate brake, reduce manufacturing costs, and restrain the leakage of the oil pressure.

According to the present invention, there is provided an automatic transmission comprising a multi-plate brake to brake a specified rotational element of a transmission mechanism, the multi-plate brake including a plurality of frictional plates, a piston to press the plural frictional plates, a piston cylinder member comprising a cylinder in which the piston slides, and an oil-pressure chamber formed between the piston and the cylinder, the oil-pressure chamber biasing the piston toward the frictional plates with an oil pressure supplied thereto, and a valve body to supply the oil pressure to the oil-pressure chamber, wherein the valve body is provided in the vicinity of an outer periphery of the piston cylinder member so as to be connected to the piston cylinder member via a connection portion, and there is provided an oil passage to supply the oil pressure from the valve body to the oil-pressure chamber via the connection portion.

According to the present invention, the oil pressure is supplied to the oil-pressure chamber between the piston and the cylinder from the valve body via the connection portion. Since the oil pressure is supplied to the oil-pressure chamber from the valve body without passing through the inside of the wall portion of the transmission case, the controllability of the multi-plate brake by the valve body can improve compared to a case in which the oil pressure is supplied via the oil passage formed in the wall portion of the transmission case. Further, since there is no need of forming such oil passage in the wall portion of the transmission case, the manufacturing costs of the automatic transmission can be kept lower. Also, the number of the members which the oil passage from the valve body to the oil-pressure chamber goes through, that is, the number of connections of the members becomes smaller. Thereby, the risk of leakage of the oil pressure can be properly reduced.

According to an embodiment of the present invention, the oil passage is provided such that an oil-pressure outlet on a side of the valve body and an oil-pressure inlet on a side of the piston cylinder member are disposed so as to face to each other substantially in a radial direction of the automatic transmission at the connection portion. Thereby, the length of the oil passage between the valve body provided in the vicinity of the outer periphery of the piston cylinder member and the oil-pressure chamber becomes properly small. Accordingly, the controllability of the multi-plate brake by the valve body can further improve.

According to another embodiment of the present invention, a transmission case which stores the transmission mechanism therein comprises a body case and an end cover which closes an opening at an end portion of the body case, the frictional plates of the multi-plate brake are supported at the end cover, and the piston cylinder member is provided at the end cover. Thereby, the multi-plate brake and the end cover can be made properly as a subassembly unit. Accordingly, the assembly can be made easier compared to an automatic transmission in which the multi-plate brake is installed inside the body case and then the end cover is attached to the body case.

According to another embodiment of the present invention, the valve body is configured to be fixed to the transmission case, and the valve body and the piston cylinder member are connected in such a manner that the oil passage is formed so as to connect in the connection portion. Thereby, coupling of the valve body to the piston cylinder member at the connection portion becomes unnecessary.

According to another embodiment of the present invention, a seal member is provided at a peripheral portion of the oil-pressure outlet of the valve body or the oil-pressure inlet of the piston cylinder member such that the oil passage is formed so as to connect tightly in the connection portion. Thereby, the properly-controlled oil pressure is supplied to the oil-pressure chamber from the valve body, restraining the leakage of oil pressure. Accordingly, the controllability of the multi-plate brake by the valve body can further improve.

Other features, aspects, and advantages of the present invention will become apparent from the following description which refers to the accompanying drawings.

BRIEF DESCRIPTION OF THE DRAWINGS

FIG. 2 is a table showing relationships between connection combinations of frictional elements and selected gears.

DETAILED DESCRIPTION OF THE INVENTION

Hereinafter, preferred embodiments of the present invention will be described.

Figure 1:
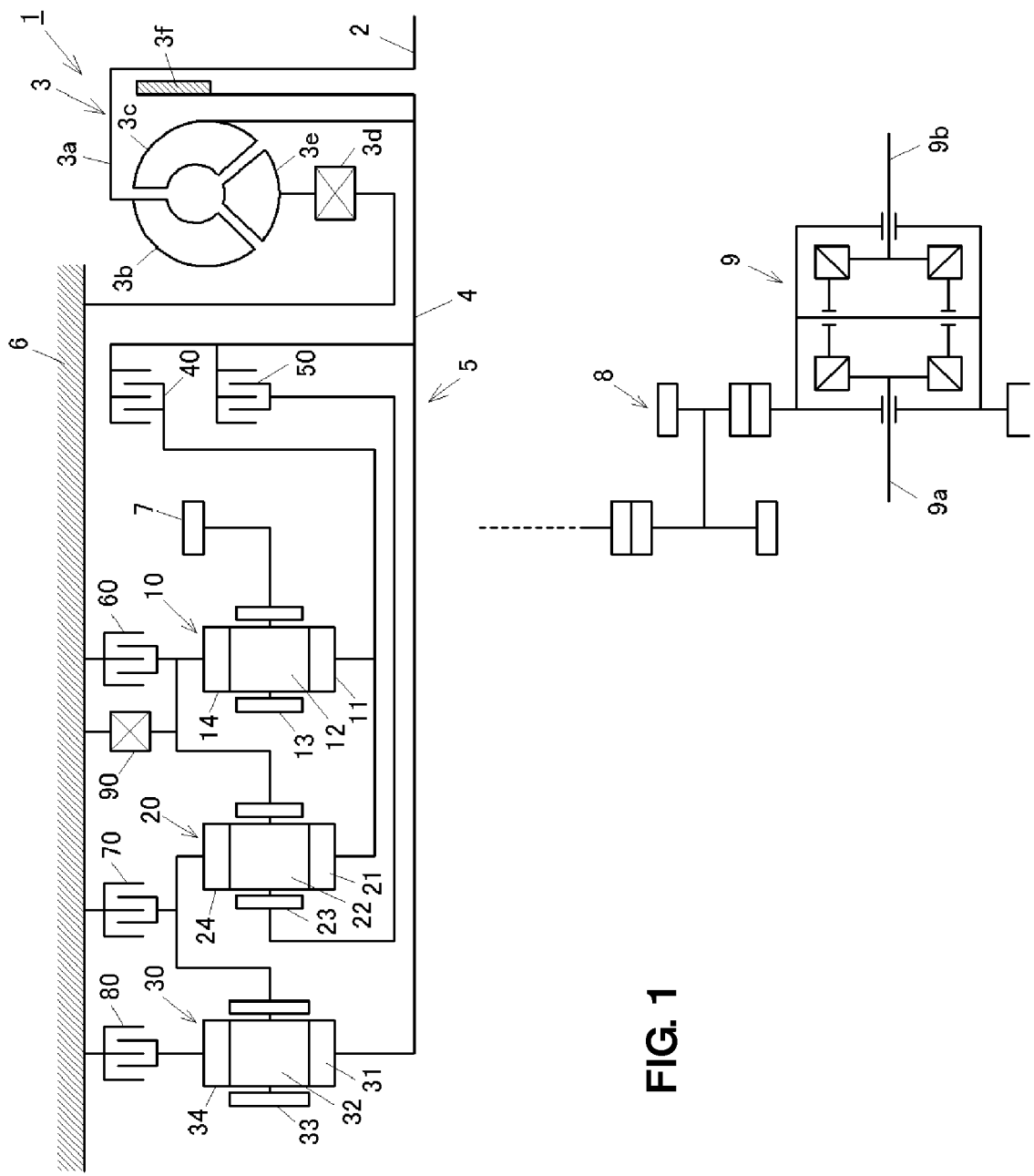
FIG. 1 is a skeleton diagram of an automatic transmission according to an embodiment of the present invention.

FIG. 1 is a skeleton diagram of an automatic transmission according to an embodiment of the present invention. An automatic transmission 1, which may be applied to an automotive vehicle with an engine disposed laterally, such as a front-engine front-drive automotive vehicle, comprises mainly a torque converter 3 which is provided at an engine output shaft 2 and a transmission mechanism 5 in which an output rotation of the torque converter 3 is inputted via an input shaft 4. The transmission mechanism 5 is stored in a transmission case 6 in such a manner that the transmission mechanism 5 is disposed on an axis of the input shaft 4.

The output rotation of the transmission mechanism 5 is transmitted to a deferential gear 9 from an output gear 7 which is disposed at a middle portion of the input shaft 4 via a counter drive mechanism 8, thereby driving right and left axels 9a, 9b.

The torque converter 3 comprises a case 3a which is connected to the engine output shaft 2, a pump 3b which is fixed inside the case 3a, a turbine 3c which is disposed facing to the pump 3b so as to be driven by the pump via an operational oil, a stator 3e which is disposed between the pump 3b and the turbine 3c so as to be supported at the transmission case 6 via a one-way clutch 3d for performing a torque increase, and a lockup clutch 3f which is provided between the case 3a and the turbine 3c so as to directly connect the engine output shaft 2 to the turbine 3c via the case 3a. The rotation of the turbine 3c is transmitted to the transmission mechanism 5 via the input shaft 4.

Meanwhile, the transmission mechanism 5 includes first, second and third planetary gear sets (hereinafter, referred to as "first, second and third gear sets" simply) 10, 20, 30, which are disposed in order on an anti torque-converter side of the output gear 7 inside the transmission case 6.

Further, a first clutch 40 and a second clutch 50 are disposed on a torque-converter side of the output gear 7. A first brake 60, a second brake 70 and a third brake 80 are disposed in order on the anti torque-converter side of the outpour gear 7. A one-way clutch 90 is disposed beside the first brake 60. These are frictional elements which constitute the transmission mechanism 5.

The first, second and third gear sets 10, 20, 30, which are a pinion-type of planetary gear set, comprise sun gears 11, 21, 31, plural pinions 12, 22, 32 which engage with these sun gears respectively, careers 13, 23, 33 which support these pinions respectively, and ring gears 14, 24, 34 which engage with the above-described pinions respectively.

The input shaft 4 is connected to the sun gear 31 of the third gear set 30. The sun gear 11 of the first gear set 10 is connected to the sun gear 21 of the second gear set 20. The ring gear 14 of the first gear set 10 is connected to the carrier 23 of the second gear set 20. The ring gear 24 of the second gear set 20 is connected to the carrier 33 of the third gear set 30. The output gear 7 is connected to the carrier 13 of the first gear set 10.

The sun gear 11 of the first gear set 10 and the sun gear 21 of the second gear set 20 are connected to the input shaft 4 via the first clutch 40. The carrier 23 of the second gear set 20 is connected to the input shaft 4 via the second clutch 50.

Further, the ring gear 14 of the first gear set 10 and the carrier 23 of the second gear set 20 are connected to the transmission case 6 via the first brake 60 and the one-way clutch 90. The ring gear 24 of the second gear set 20 and the carrier 33 of the third gear set 30 are connected to the transmission case 6 via the second brake 70. Further, the ring gear 34 of the third gear set 30 is connected to the transmission case 6 via the third brake 80.

The transmission mechanism 5 achieves shifts for the six-forward gears and the reverse gear with connection combinations of the first and second clutches 40, 50 and the first, second and third brakes 60, 70, 80. The relationships between connection combinations of these frictional elements and selected gears are shown in the table of FIG. 2.

That is, the first clutch 40 and the first brake 60 are connected to each other in the first gear, where the rotation of the input shaft 4 is inputted to the sun gear 11 of the first gear set 10 with a great speed reduction by the first gear set 10, and then outputted from the carrier 13 of the first gear set 10 to the output gear 7. Herein, the first brake 60 is connected only in the first gear state where the engine brake works. In the first gear state where the engine brake does not work, the one-way clutch 90 is locked up for accomplishing the first gear.

In the second gear, the first clutch 40 and the second brake 70 are connected to each other, where the rotation of the input shaft 4 is inputted to the sun gear 11 of the first gear set 10 and at the same time inputted to the ring gear 14 of the first gear set 10 via the second gear set 20 with a smaller ratio of speed reduction than the first gear, and then outputted from the carrier 13 of the first gear set 10 to the output gear 7.

In the third gear, the first clutch 40 and the third brake 80 are connected to each other, where the rotation of the input shaft 4 is inputted to the sun gear 11 of the first gear set 10 and at the same time inputted to the ring gear 14 of the first gear set 10 via the third gear set 30 and the second gear set 20 with a smaller ratio of speed reduction than the second gear, and then outputted from the carrier 13 of the first gear set 10 to the output gear 7.

In the fourth gear, the first clutch 40 and the second clutch 50 are connected to each other, where the rotation of the input shaft 4 is inputted to the sun gear 11 of the first gear set 10 and at the same time inputted to the ring gear 14 of the first gear set 10 via the second gear set 20 directly. Thereby, the whole first gear set 10 rotates along with the input shaft 4, so that the rotation of the input shaft 4 is outputted from the carrier 13 to the output gear 7 with the speed reduction ratio of 1.

In the fifth gear, the second clutch 50 and the third brake 80 are connected to each other, where the rotation of the input shaft 4 is inputted to the ring gear 14 of the first gear set 10 via the second gear set 20 directly and at the same time inputted to the sun gear 11 of the first gear set 10 via the third gear set 30 and the second gear set 20. Thereby, the rotation of the input shaft 4 is outputted from the carrier 13 of the first gear set 10 to the output gear 7 with the speed increase.

In the sixth gear, the second clutch 50 and the second brake 70 are connected to each other, where the rotation of the input shaft 4 is inputted to the ring gear 14 of the first gear set 10 via the second gear set 20 directly and at the same time inputted to the sun gear 11 of the first gear set 10 via the second gear set 20. Thereby, the rotation of the input shaft 4 is outputted from the carrier 13 of the first gear set 10 to the output gear 7 with a greater speed increase ratio than the fifth gear.

Further, in the reverse gear, the first brake 60 and the third brake 80 are connected to each other, where the rotation of the input shaft 4 is inputted to the sun gear 11 of the first gear set 10 via the second gear set 20 and the third gear set 30. Herein, the rotational direction is reversed by the second gear set 20, so that the rotation of the input shaft 4 is outputted from the carrier 13 of the first gear set 10 to the output gear 7 with a reverse rotation.

As described, the transmission mechanism 5 of the present embodiment comprises three single-pinion type of planetary gear sets 10, 20, 30 and the five frictional elements 40, 50, 60, 70, 80 and achieves shifts for the six-forward gears and the reverse gear with these components.

Figure 3:
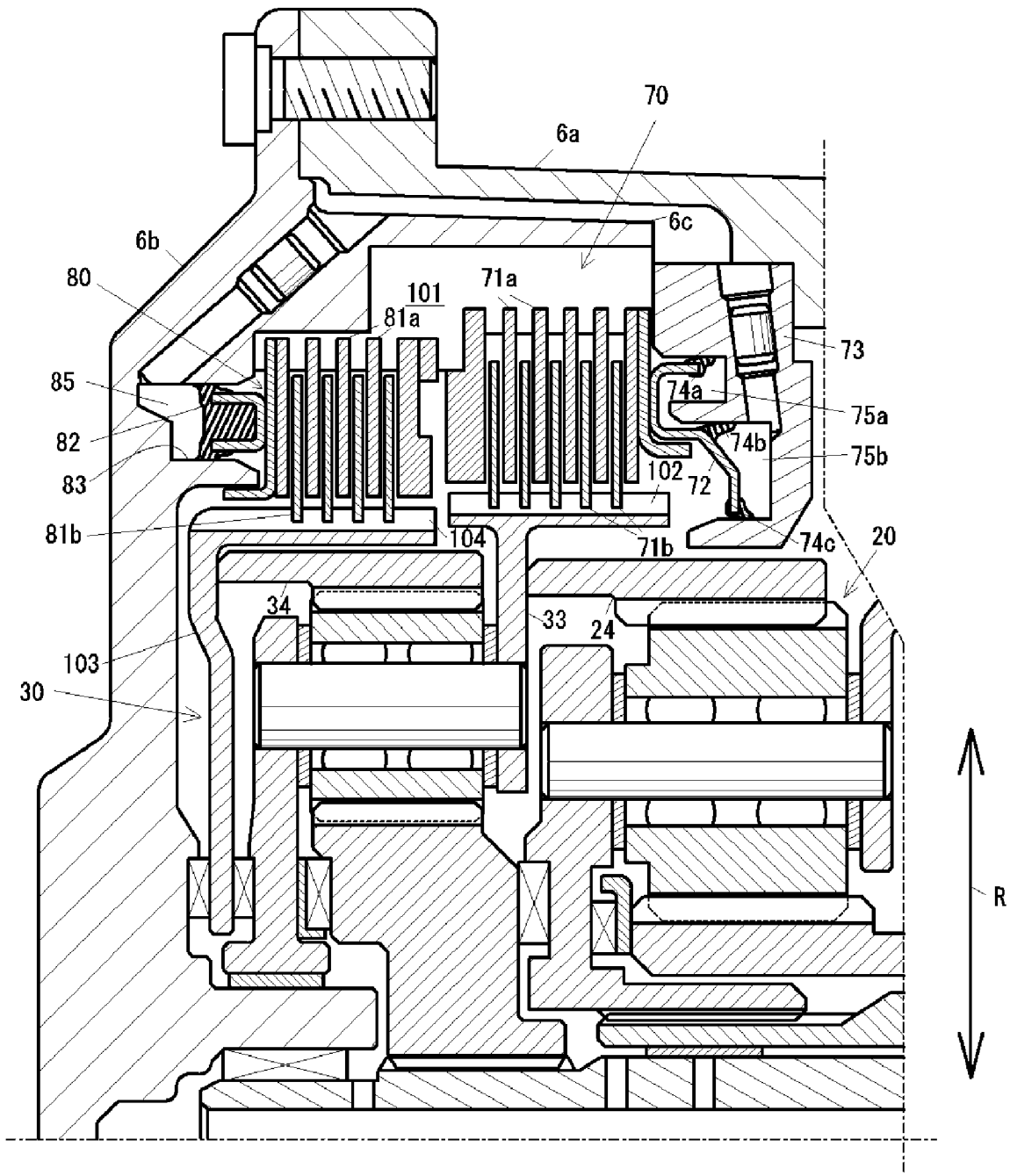
FIG. 3 is a sectional view of two multi-plate brakes and their surroundings.
Figure 4:
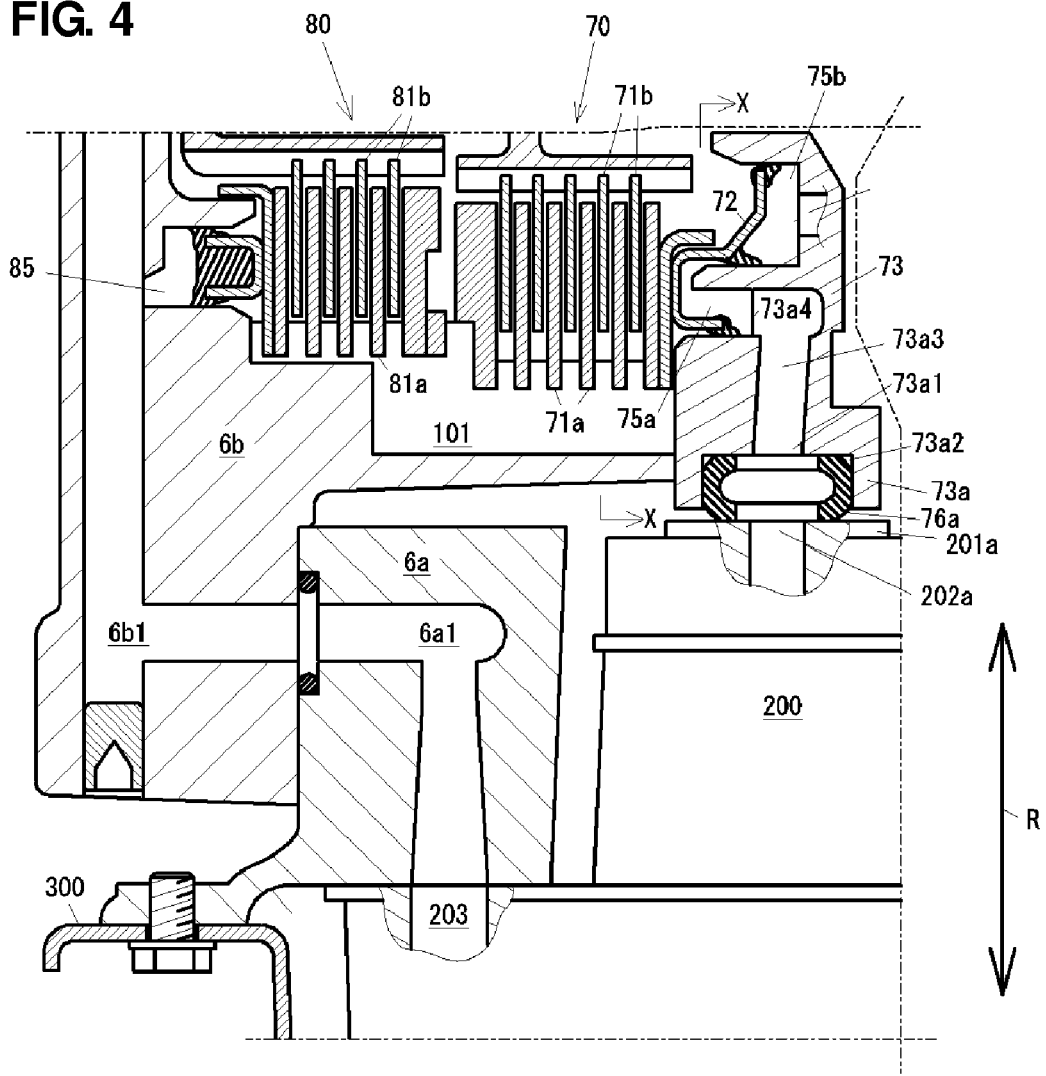
FIG. 4 is a sectional view of another part of the two multi-plate brakes and their surroundings.

Hereinafter, the specific structure of the second brake 70, the third brake 80 and their surroundings which are disposed on the rear side of the transmission mechanism 5, which are features of the present invention, will be described referring to FIGS. 3 and 4. FIG. 3 is a sectional view of an upper part and FIG. 4 is a sectional view of a lower part (on the side of an oil pan which will be described later) of the automatic transmission in the vertical direction.

As shown in FIG. 3, the transmission case 6 comprises a body case 6a to store the transmission mechanism 5 and an end cover 6b to close the opening of a rear end face of the body case 6a.

Near the end cover 6b are respectively disposed the second gear set 20 and the third gear set 30 which are located side by side in the axial direction on the inner peripheral side and the second brake 70 and the third brake 80 which are located side by side in the axial direction on the outer peripheral side.

The second brake 70, which is a multi-plate brake with plural fictional plates, comprises fixing-side frictional plates 71a and rotational-side frictional plates 71b. Splines which are formed on the outer periphery of the fixing-side frictional plates 71a engage with a spline-engagement portion 101 which is formed at an inner peripheral face of a cylindrical projecting portion 6c which extends toward an inside space of the base case 6a from the end cover 6b. Splines which are formed on the inner periphery of the rotational-side frictional plates 71b engage with another spline-engagement portion 102 which is formed at an outer peripheral face of the carrier 33 which is disposed on the anti end-cover side of the third gear set 30.

Further, the second brake 70 includes a piston 72 which presses the plural frictional plates 71a, 71b toward the end cover and a piston cylinder member 73 which comprises a cylinder (slide face) in which the piston slides.

The piston cylinder member 73, which is a think ring-shaped member which is fixed to a tip of the projecting portion 6c of the end cover 6b by a bolt (not illustrated), forms two oil-pressure chambers 75a, 75b together with the piston 72 and three seal members 74a, 74b, 74c provided at a slide portion of the piston 72.

The oil pressure is supplied to these two oil-pressure chambers 75a, 75b from a valve body 200 which is disposed in the vicinity of an outer periphery of the piston cylinder member 73 as shown in FIG. 4. The valve body 200 is fixed to the body case 6a.

The valve body 200 is attached so as to be fixed to a specified fixing position on the lower side of the body case 6a, so that it is disposed in the vicinity of an outer periphery of the piston cylinder member 73. Specifically, after the end cover 6b is attached to the tip of the projecting portion 6c (subassembly), the valve body 200 is assembled (attached) to the above-described specified fixing position from below. Further, after the valve body 200 is attached to the body base 6a, the oil pan 300 is attached to the body case 6a. Thus, the valve body 200 is disposed in the oil pan 300.

The valve body 200 has connection portions 201a, 201b for connecting to the piston cylinder member 73 at portions facing to this member 73.

Figure 5:
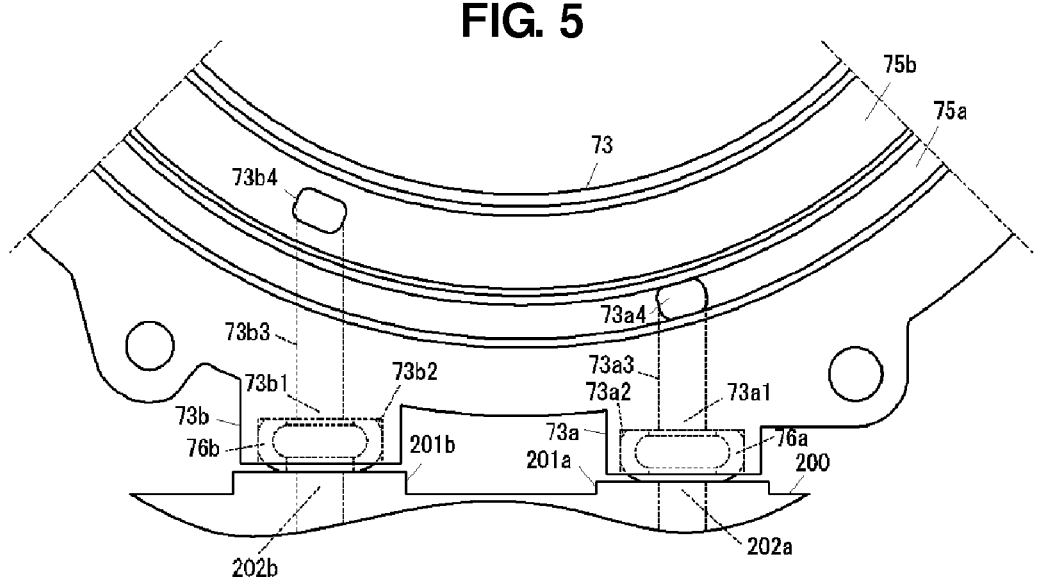
FIG. 5 is a view showing part of a piston cylinder member and a valve body, when seen from a direction X of FIG. 4.

Specifically, as shown in FIG. 5 which is a view showing part of the piston cylinder member 73 and the valve body 200, when seen from a direction X of FIG. 4, the connection portions 201a, 201b of the valve body 200 which connect to the piston cylinder member 73 provide passage portions to supply the oil pressure to the oil-pressure chambers 75a, 75b of the second brake 70. The connection portions 201a, 201b have oil-pressure outlets 202a, 202b to output the oil pressure. These oil-pressure outlets 202a, 202b open in a radial direction R of the automatic transmission as shown in FIG. 4.

Meanwhile, the piston cylinder member 73 has connection portions 73a, 73b at respective its portions which face to the connection portions 201a, 201b of the valve body 200. These connection portions 73a, 73b have oil-pressure inlets 73a1, 73b1 through which the oil pressure is supplied from the valve body 200. The oil-pressure inlets 73a1, 73b1 open in the radial direction R so as to face to the oil-pressure outlets 202a, 202b of the valve body 200 as shown in FIG. 4.

Herein, the connection portions 201a, 201b of the valve body 200 and the connection portions 73a, 73b of the piston cylinder member 73 do not engage with each other, but connect to each other so as to establish an oil-pressure path from the valve body 200 to the piton cylinder member 73. Specifically, the oil-pressure inlets 73a1, 73b1 of the connection portions 73a, 73b of the piston cylinder member 73 are formed at bottoms of recess portions 73a2, 73b2 which are provided at the connection portions 73a, 73b so as to open facing to the valve body 200. Ring-shaped rubber seal members 76a, 76b are inserted with pressure into the recess portions 73a2, 73b2 respectively so as not to close the inlets 73a1, 73b1. The rubber seal members 76a, 76b are provided such that part of them project from the recess portions 73a2, 73b2, and these projecting portions elastically contact respective peripheries of the oil-pressure outlets 202a, 202b of the connection portions 201a, 201b of the valve body 200.

In the assembly, as the valve body 200 is moved from below so as to contact the above-described specified fixing position of the body case 6a, the connection portions 201a, 201b come to contact the rubber seal members 76a, 76b inserted with pressure into the recess portions 73a2, 73b2 of the piston cylinder member 73. Then, the valve body 200 is fixed to the body case 6a, so that the connection portions 201a, 201b press and deform the rubber seal members 76a, 76b.

Thereby, the oil-pressure outlets 202a, 202b of the valve body 200 and the oil-pressure inlets 73a1, 73b1 of the piston cylinder member 73 are connected to each other tightly, so that the oil passage from the oil-pressure outlets 202a, 202b to the oil-pressure inlets 73a1, 73b1 is established.

Further, the oil-pressure inlet 73a1 of the piston cylinder member 73 connects to an oil passage 73a3 which is provided inside the piston cylinder member 73 and the oil-pressure chamber 75a of the second brake 70 via an opening 73a4. The oil-pressure inlet 73b1 connects to the oil-pressure chamber 75b via an oil passage 73b3 and an opening 73b4. Thereby, the oil pressure from the valve body 200 is supplied to the two oil-pressure chambers 75a, 75b.

Next, the reason why the second brake 70 includes the two oil-pressure chambers 75a, 75b will be described. Also, the method of supplying the oil pressure will be described referring to an oil-pressure circuit shown in FIG. 6.

The oil pressure is supplied to the inside oil-pressure chamber 75b first and then supplied to the outside oil-pressure chamber 75a with a specified delay time. This is materialized by the oil-pressure circuit of FIG. 6 actually.

Figure 6:
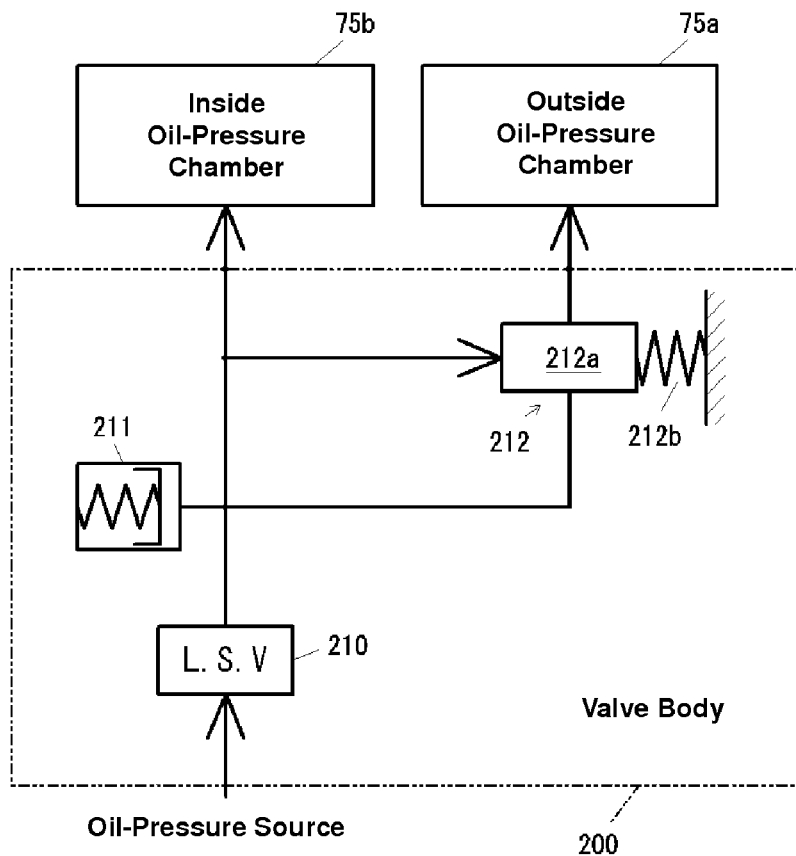
FIG. 6 is a diagram of an oil-pressure circuit of a brake.

As shown in FIG. 6, the oil-pressure circuit comprises an oil-pressure source, such as an oil pump, two oil-pressure chambers 75a, 75b, and the valve body 200 to control the oil pressure supplied to these two oil-pressure chambers.

The valve body 200 comprises, as control elements for the second brake 70, a linear solenoid valve (LSV) 210 which controls the value of the oil pressure supplied to the two oil-pressure chambers 75a, 75b, an accumulator 211 which is disposed downstream (anti oil-pressure-source side) and restrains occurrences of overshoot or undershoot due to the pressure change, and an opening/closing valve 212 which is disposed between the oil-pressure chamber 75a and the LSV 210 and controls the oil-pressure supply to the oil-pressure chamber 75a.

The LSV 210 is configured to control the oil-pressure supply such that the oil pressure of the oil-pressure chambers 75a, 75b becomes a specified value while the second brake 70 is in a connection state. Further, it is configured such that the oil-pressure supply is limited while the second brake 70 is a non-connection state. By the LSV 210 controlling the oil-pressure supply, the second brake 70 is made in the connection state or the non-connection state at a specified timing (according to the connection table of FIG. 2, at the sift timing of the second gear, for example)

The accumulator 211 is configured such that the oil pressure is restrained from increasing quickly right after the oil pressure is supplied by the LSV 210 (restraining the overshoot) and such that the oil pressure is restrained from decreasing quickly right after the oil-pressure supply is limited (restraining the undershoot)

The opening/closing valve 212 is configured such that it opens (so as to connect the oil-pressure source to the oil-pressure chamber 75a) with a valve 212a which is pressed by the oil pressure supplied to the oil-pressure chamber 75b (when reaching a specified value of the oil pressure). Otherwise, the valve 212a is biased by a spring 212b so as to be located in its close position.

According to the oil-pressure circuit described above, as the LSV 210 starts the oil-pressure supply (increases the oil-pressure value) for the connection of the second brake 70, the oil pressure is supplied to the oil-pressure chamber 75b.

The oil pressure of the oil-pressure chamber 75b increases gradually, and the piston 72 is pressed by the oil pressure. Thereby, the piston 72 starts to press the plural frictional plates 71a, 71b.

Once the oil pressure of the oil-pressure chamber 75b has reached a specified value, the valve 212 opens and thereby the oil-pressure supply to the oil-pressure chamber 75a starts as well.

Then, the oil pressure of the oil-pressure chamber 75b increases gradually, and the piston 72 is pressed by this oil pressure increased. Thereby, the piston 72 further presses the plural frictional plates 71a, 71b.

As described above, when the oil-pressure supply starts by the LSV 210, the oil pressure is supplied to the oil-pressure chamber 75b first and then supplied to the oil-pressure chamber 75a with the specified delay time. Accordingly, the press force by the oil pressure acting on the piston 72 increases gradually from zero. As a result, the connection operation of the second brake 70 can be controlled precisely and specifically. Also, the occurrence of a shift shock due to the abrupt increase of the press force of the piston can be properly restrained. Further, since the oil pressure is supplied to both the oil-pressure chambers 75a, 75b after the connection, the necessary transmission torque capacity can be ensured.

Meanwhile, as shown in FIGS. 3 and 4, the third brake 80, which is the multi-plate brake with plural fictional plates like the second brake 70, comprises fixing-side frictional plates 81a and rotational-side frictional plates 81b. Splines which are formed on the outer periphery of the fixing-side frictional plates 81a engage with the spline-engagement portion 101. Splines which are formed on the inner periphery of the rotational-side frictional plates 81b engage with another spline-engagement portion 104 which is formed at an outer peripheral face of a cylinder 103 which is integrally connected to the ring gear 34 of the third gear set 30.

Further, the third brake 80 includes a piston 82 which presses the plural frictional plates 81a, 81b toward an anti end-cover side. The piston 82 does not slide in a cylinder (on a slide face) of the piston cylinder member 73 unlike the second brake 70, but slides a cylinder (slide face) 83 which is formed at the end cover 6b.

The oil-pressure chamber of the third brake 80 is comprised of a space 85 which is formed between the piston 82 and the cylinder 83 formed at the end cover 6b.

The oil pressure is supplied to the oil-pressure chamber 85 from an oil-pressure outlet 203 if the valve body 200 via an oil passage 6a1 which is formed at the body case 6a and an oil passage 6b1 which is formed at the end cover 6b as shown in FIG. 4.

Thus, the oil-pressure supply to the oil-pressure chamber 85 of the third brake 80 is conducted via a supply path which is longer than that to the two oil-pressure chambers 75a, 75b of the second brake 70. This is because the second brake 70 requires more specific control than the second brake 80.

According to the present embodiment, the valve body 200 is provided in the vicinity of the outer periphery of the piston cylinder member 73 so as to be connected to the piston cylinder member 73 via the connection portions 201a, 201b, 73a, 73b, and there is provided the oil passage to supply the oil pressure from the valve body 200 to the oil-pressure chambers 75a, 75b via the connection portions 201a, 201b, 73a, 73b. Thereby, the oil pressure is supplied to the oil-pressure chambers 75a, 75b between the piston 72 and the cylinder from the valve body 200 via the connection portions 201a, 201b, 73a, 73b. Since the oil pressure is supplied to the oil-pressure chambers 75a, 75b from the valve body 200 without passing through the inside of the transmission case 6a, 6b, the controllability of the multi-plate brake by the valve body 200 can improve compared to a case in which the oil pressure is supplied via the oil passage formed in the wall portion of the transmission case 6a, 6b. Further, since there is no need to form such oil passage in the wall portion of the transmission cases 6a, 6b, the manufacturing costs of the automatic transmission can be kept lower. Also, the number of the members which the oil passage from the valve body 200 to the oil-pressure chambers 75a, 75b goes through, that is, the number of connections of the members becomes smaller. Thereby, the risk of leakage of the oil pressure can be properly reduced.

Further, according to the present embodiment, since the piston cylinder member 73 is attached to the end cover 6b, that is, the second brake 70 and the third brake 80 are disposed on the end-cover 6b side of the piston cylinder member 73, the subassembly of the second brake 70, third brake 80 and end cover 6b may be possible. Accordingly, the assembly improves compared to an automatic transmission in which the components of brake are attached inside the body case and then the end cover is attached to the body case.

Also, according to the present embodiment, the valve body 200 is attached to the transmission case 6a, and the valve body 200 and the piston cylinder member 73 are connected in such a manner that the oil passage is formed so as to connect in the connection portions 201a, 201b, 73a, 73b. Thereby, coupling of the valve body 200 to the piston cylinder member 73 at the connection portion becomes unnecessary.

The present invention should not be limited to the above-described embodiment.

For example, according to the above-described embodiment, the oil passage is configured such that the oil-pressure outlet 202a (202b) of the valve body 200 and the oil-pressure inlet 73a1 (73b1) of the piston cylinder member 73 are disposed so as to face to each other substantially in the radial direction R at the connection portion. Thereby, the length of the oil passage between the oil-pressure chamber 75a (75b) and the valve body 200 provided on the outer-periphery side of the oil-pressure chamber 75a (75b) becomes properly small. This is because the controllability of the second brake 70 which is obtained by omitting any oil passage in the wall portion of the transmission case can be further improved. Therefore, if only one oil-pressure chamber is provided unlike the second brake 70 with the two oil-pressure chambers, or the supreme controllability is not necessarily required like the second brake 70, the above-described facing provision of the oil-pressure outlet 202a (202b) and the oil-pressure inlet 73a1 (73b1) may not be necessary.

Figure 7:
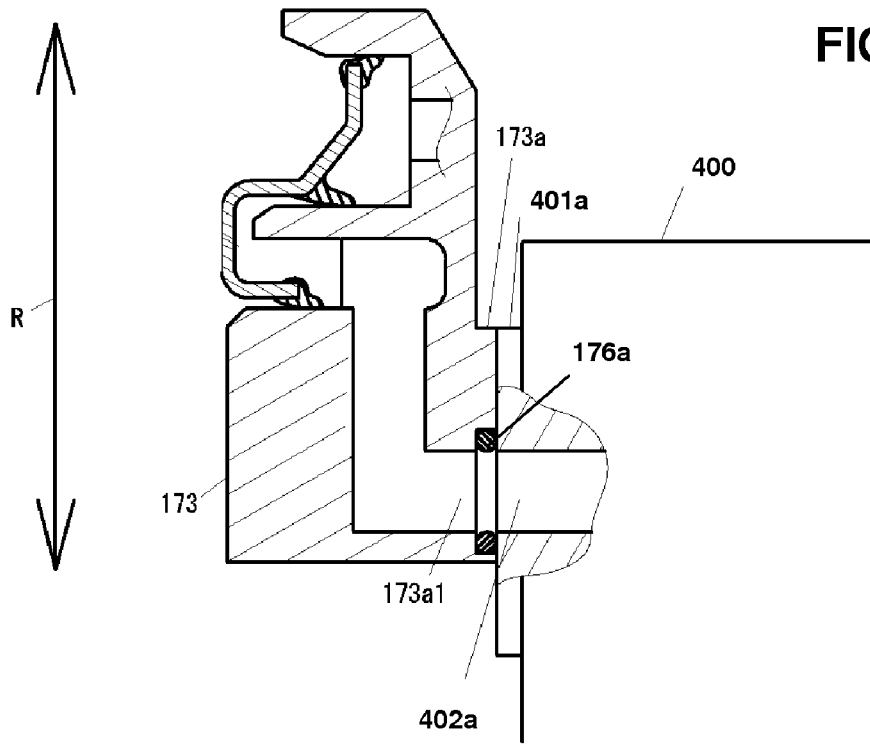
FIG. 7 is a view showing a connection portion of the piston cylinder member and the valve body according to another embodiment.

For example, as shown in FIG. 7, an oil-pressure outlet 402a of a valve body 400 and an oil-pressure inlet 173a1 of a piston cylinder member 173 may be disposed so as to face to each other in an axis direction which is perpendicular to the radial direction R. In this case, the length of the oil passage may be longer than that of the above-described embodiment. Accordingly, as shown in FIG. 7, a connection portion 401a of the valve body 400 disposed on the outer-periphery side of the transmission case and a connection portion 173a of a piston cylinder member 173 may be preferably disposed so as to overlap with each other in the axial direction. For example, an outer peripheral portion (connection portion 401a) of the piston cylinder member 173 may be preferably disposed so as to project greatly to the valve-body side from the transmission case, or the connection portion 401a of the valve body 400 may be preferably disposed so as to recess into the transmission case. Herein, in FIG. 7, reference character 176b denotes a rubber seal member.

Further, while the rubber seal member 76a (76b) is provided between the oil-pressure outlet 202a (202b) of the valve body 200 and the oil-pressure inlet 73a1 (73b1) of the piston cylinder member 73 for the purpose of a tight connection in the above-described embodiment, it may be omitted if such proper a tight connection is obtained by another means.

Also, while the rubber seal member 76a (76b) is provided at the piston seal member 73 in the above-described embodiment, it may be provided at the valve body 200 instead.

Any other modifications and improvements may be applied in the scope of a spirit of the present invention.

What is claimed is:

1. An automatic transmission, comprising:
a transmission case storing a transmission mechanism therein, the transmission case comprising a body case and an end cover closing an opening at an end portion of the body case;
a multi-plate brake to brake a specified rotational element of the transmission mechanism, the multi-plate brake including a plurality of frictional plates, a piston to press the plural frictional plates, a piston cylinder member comprising a cylinder in which the piston slides, and an oil-pressure chamber formed between the piston and the cylinder, the oil-pressure chamber biasing the piston toward the frictional plates with an oil pressure supplied thereto; and
a valve body to supply the oil pressure to the oil-pressure chamber, the valve body being provided in the vicinity of an outer periphery of the piston cylinder member,
wherein said piston cylinder member includes a connection portion which is formed integrally with the piston cylinder member and separately from said body case and said end cover of the transmission case, the connection portion projecting toward said valve body and including an oil passage to supply the oil pressure from said valve body to said oil-pressure chamber therein, the oil passage extending straightly in a radial direction of the automatic transmission over an entire length thereof from the valve body to the oil-pressure chamber.

2. The automatic transmission of claim 1, wherein said oil passage is provided such that an oil-pressure outlet on a side of said valve body and an oil-pressure inlet on a side of said connection portion of the piston cylinder member are disposed so as to face to each other substantially in the radial direction of the automatic transmission.

3. The automatic transmission of claim 2, wherein the frictional plates of said multi-plate brake are supported in the end cover, and said piston cylinder member is provided on the end cover.

4. The automatic transmission of claim 2, wherein said valve body is fixed to the transmission case, and said oil-pressure outlet on the side of the valve body and said oil-pressure inlet on the side of the connection portion are connected to each other tightly without leaking of the oil pressure.

5. The automatic transmission of claim 4, wherein a seal member is provided at a peripheral portion of said oil-pressure outlet of the valve body or said oil-pressure inlet of the connection portion.

6. The automatic transmission of claim 1, wherein the frictional plates of said multi-plate brake are supported in the end cover, and said piston cylinder member is provided on the end cover.

* * * * *